United States Patent [19]

Toba et al.

[11] Patent Number: 4,755,393
[45] Date of Patent: Jul. 5, 1988

[54] PROCESS FOR THE PRODUCTION OF MEAT-LIKE FOODSTUFFS

[75] Inventors: Shigeru Toba, Yokohama; Mariko Kawabe, Tokyo; Takahiko Soeda, Chigasaki; Masao Toshima, Yokohama, all of Japan

[73] Assignee: Ajinomoto General Foods Protein, Inc., Tokyo, Japan

[21] Appl. No.: 511,815

[22] Filed: Jul. 8, 1983

[51] Int. Cl.$^4$ ............................................. A23J 3/00
[52] U.S. Cl. .................................. 426/613; 426/656; 426/657; 426/802
[58] Field of Search ............... 426/104, 613, 656, 657, 426/802

[56] References Cited

U.S. PATENT DOCUMENTS

| | | | |
|---|---|---|---|
| 3,558,324 | 1/1971 | Page et al. | 426/104 X |
| 3,870,805 | 3/1975 | Hayes et al. | 426/656 |
| 3,922,352 | 11/1975 | Tewey et al. | 426/802 X |
| 3,940,495 | 2/1976 | Flier | 426/656 X |
| 4,052,517 | 10/1977 | Youngquist | 426/656 X |
| 4,133,897 | 1/1979 | Flanyak et al. | 426/802 X |
| 4,226,890 | 10/1980 | Howard | 426/656 X |

FOREIGN PATENT DOCUMENTS

| | | | |
|---|---|---|---|
| 202253 | 12/1982 | Japan | 426/656 |
| 89145 | 5/1983 | Japan | 426/656 |

*Primary Examiner*—Arthur L. Corbin
*Attorney, Agent, or Firm*—Linn I. Grim; Daniel J. Donovan

[57] ABSTRACT

Meat-like foodstuffs are prepared in a process which comprises mixing an oil-in-water type emulsion having compression oil-releasing ratio of at least 15% with fibrous proteins, such as soy bean, and binders. The resulting mixture is molded and heated to produce a foodstuff having a juicy feeling and closely resembling natural meat.

6 Claims, No Drawings

PROCESS FOR THE PRODUCTION OF MEAT-LIKE FOODSTUFFS

TECHNICAL FIELD

The present invention relates to a process for the production of meat-like foodstuffs. More particularly, the present invention is concerned with a process for producing novel meat-like foodstuffs closely resembling natural meat.

BACKGROUND OF THE INVENTION

In recent years, in view of the acute shortage of protein foods and the spread of health foods, various attempts have been made to produce meat-like foodstuffs from those substances containing vegetable proteins such as soy bean protein. For example, there is known a method in which soy bean protein fibers, etc., are spinned and bonded together or solidified with heat-coagulative binders. Foodstuffs produced by this method, however, are not juicy and give tasteless impression; the method fails to produce foodstuffs resembling natural meat. Although further improved methods have been proposed, there can be obtained only those foodstuffs which are seriously inferior in taste and flavor as compared with natural meat, and thus, any of the conventional methods are not satisfactory.

SUMMARY OF THE INVENTION

As a result of extensive investigations to produce meat-like foodstuffs closely resembling natural meat, giving a juicy impression and having a fibrous feeling, from vegetable protein-containing substances, it has been found that the desired meat-like foodstuffs can be produced using o/w (oil in water) type emulsions and fibrous proteins which are prepared by specific procedures.

The present invention relates to a process for producing meat-like foodstuffs which comprises mixing:

(1) an o/w type emulsion having a compression oil-releasing ratio of at least 15% and composed mainly of (a) protein, (b) fats and oil, and (c) water, the weight ratio of (a), (b), (c) being 1:6.3–40:1–20;

(2) a fibrous protein which is prepared by kneading a mixture of a vegetable protein-containing substance and water, orientating the resulting mixture by applying shear stress in a heated state and, thereafter, splitting it; and (3) a binder, and molding and heating the resulting mixture.

DETAILED DESCRIPTION OF THE INVENTION

In accordance with the process of the invention, o/w type emulsions are mixed with fibrous proteins and binders, and the resulting mixtures are molded and heated to produce meat-like foodstuffs.

The term "compression oil-releasing ratio" as used herein refers to a ratio of the weight of fats and oils released when an o/w type emulsion is heated at 100° C. for 30 minutes, cooled, and compressed for one minute at 37° C. under a load of 15 kilograms per square centimeter ($kg/cm^2$) to the weight of the emulsion before compression. This ratio can be deemed as a measure of representing a juicy feeling spreading in the mouth when the meat-like foodstuff is actually chewed.

The o/w type emulsion as used herein has a compression oil-releasing ratio of at least 15% and is composed mainly of (a) protein, (b) fats and oils and (c) water, the weight ratio of (a), (b), (c) being 1:6.3–40:1–20.

In producing these emulsions, proteins derived from any protein sources can be used, including vegetable proteins and animal proteins. Examples of vegetable proteins include defatted products of oil stuff seeds (e.g., soy bean) and proteins separated therefrom, and cereal proteins (e.g., wheat gluten, corn gluten and rice gluten). Examples of animal proteins include egg protein, milk protein, gelatin, and colagen.

Fats and oils are also not critical in the present invention; any types of fats and oils can be used, including vegetable fats and oils, and animal fats and oils. Examples are vegetable fats and oils derived from, e.g., soy bean, corn, cotton seed, rapeseed, rice, peanut, and palm, and animal fats and oils, such as lard and tallow. These fats and oils may be liquid or solid. If necessary, edible emulsifiers, emulsion stabilizers, tackifiers, etc., for example, lecithin, sugar ester, and gum, can be further added.

With o/w type emulsions in which the weight ratio of (a), (b) and (c) are outside the range as defined above, there can be obtained no satisfactory meat-like products. For example, when the weight ratio of (b) oil and fat to (a) protein is less than 6.3:1, no satisfactory oily substance can be obtained, and when the weight ratio of (b) to (a) is more than 40:1, an o/w type emulsion is not formed. Also, when the weight ratio of (c) water to (a) protein is less than 1:1, an o/w type emulsion is not formed, and when the weight ratio of (c) to (a) is more than 20:1, the fat and oil content decreases and the resulting product becomes liquid, and thus, there are obtained only those products which are unsuitable as oily substances.

The o/w type emulsion as used herein is generally prepared as follows:

A mixture of protein, fat and oil, water, and additives to be added if necessary is stirred in a stirring apparatus, such as a silent cutter, a homomixer, and a homogenizer, at a rate of from 500 to 10,000 revolutions per minutes (rpm) and usually from 1,000 to 5,000 rpm for a predetermined time, usually from 5 to 30 minutes to prepare a stable o/w type emulsion. While stirring the o/w type emulsion in a low speed-rotary stirring apparatus, such as an electric mixer, and a kneader, at a low rate of not more than 1,000 rpm, the difference in the number of revolutions between the present low speed stirring apparatus and the above-described high speed stirring apparatus being at least 200 rpm, fat and oil, and if necessary, flavoring matters, flavors, proteins, etc., are added thereto. The low speed stirring apparatus is run usually at a rate of from 50 to 500 rpm and preferably at a rate of from 100 to 500 rpm. It is required for the fat and oil, etc. to be gradually added and mixed. This permits to obtain an emulsion having a high fat and oil content.

By increasing the ratio of the amount of fat and oil to be added at the second stirring stage while stirring at a low rate to the amount of the fat and oil to be added at the first stage while stirring at a high rate, there can be obtained preferred oily substances. The ratio of (A) the amount of fat and oil being added at the first stage to (B) the amount of fat and oil being added at the second stage can be changed within the range of (A):(B)=3:1 to 1:10 although it varies depending on the type and total amount of fat and oil. Usually, it is suitable that the ratio of (A):(B) is from 2:1 to 1:5.

The thus-obtained emulsion having a high fat and oil content is soft and takes various forms, from paste to solid, although it varies depending on the types of protein, and fat and oil. In general, when the fat and oil content is low and the water content is high, the emulsion is a soft paste, whereas when the fat and oil content is high and the water content is low, the emulsion is solid. In both cases, the emulsion has an appearance closely resembling natural fat of meat.

The fibrous protein as used herein is prepared by kneading a mixture of a vegetable protein-containing substance and water, orientating the resulting mixture by applying shear stress in a heated stated and then splitting it. Vegetable protein containing substances which can be used include the defatted products of oil stuff seeds, such as soy bean, and proteins separated therefrom, and cereal proteins (e.g., wheat gluten, corn gluten, and rice protein) as described hereinbefore. Preferred is a substance which is composed of soy bean protein and wheat gluten, the weight ratio of the soy bean protein to the wheat gluten being within the range of from 8:2 to 2:8, and which has a protein content (calculated as solids) of at least 40%. The amount of water to be mixed with the fibrous protein can be changed over a wide range, and the optimum amount of water being added varies depending on the type of the vegetable protein-containing substance. In general, the amount of water is from about 20 to 65% by weight and preferably from about 30 to 65% by weight based on the total dry amount of the composition. If necessary, salt and other additives can be added appropriately. Before kneading, the mixture may be preliminarily heated. In the case of adding salt, the amount of salt added is from about 0.5 to 15% by weight and preferably from about 1 to 10% by weight based on the total dry amount of the composition.

Upon application of shear stress on the fibrous protein-water mixture in a thermoplastic state while transporting, the mixture is orientated easily and thoroughly. At this processing, the preferred heating temperature is usually from 100° to 200° C. although it varies depending on the type of the protein-containing substance, the amounts of water and other additives being added, and so forth. In particular, when the amount of salt added is small, if the heating temperature is lowered, or when the amount of salt added is large, if the heating temperature is raised, there can be obtained a suitable fibrous protein. The pressure to be applied onto the mixture is sufficient to be higher than that required for moving the plasticized mixture, and its upper limit has interrelationship with the heating temperature. The pressure being applied is usually 36 kilograms per square centimeter and preferably from 7 to 25 kilograms per square centimeter.

When the mixture is processed as described above and the pressure is released, there is obtained a sheet or rod-like product. In order to obtain high quality fibers, it is important that the pressure and/or temperature at the terminal is controlled so that the product does not substantially swell (the degree of swelling is 20% or less and preferably 10% or less).

As a means of applying sheer stress in a heat-plasticized state while transporting the mixture, there can be used, for example, an extruder equipped with a heating unit, a screw, a driving unit, a nozzle, and a feed inlet. In more detail, as described in the example as described hereinafter, it is desirable to use an extruder equipped with a feed inlet, a screw attached to a driving unit, a heating unit to press-heat the feed, and a nozzle attached to the outlet. The use of an extruder equipped with such nozzles permits to control the pressure and/or temperature at the terminal and to obtain high quality fibers which do not substantially swell. The temperature in the vicinity of the nozzle discharge end is desirable to adjust so that it is lower by from 20° to 60° C. than that at the central part of the extruder, which is demonstrated in the example as described hereinafter.

The thus-obtained product is in a fibrous form and provides a good eating feeling. It is desirable, however, that the product is split by a method as described hereinafter to form split fibers. That is, the orientated sheet or rod-like product is split in a softened condition; i.e., divided into long fibrous forms. This splitting is carried out by means of splitting rolls, or by bringing the product into contact with a dull knife at a high speed.

As splitting rolls, those rolls with a number of file ridges engraved in the surface thereof, as in the case of a sheet cutter, and those rolls having needles such as brushes are used. These splitting rolls are usually placed in the vicinity of the discharge outlet through which the sheet or rod-like product is discharged, and in a direction perpendicular to the direction in which the product is discharged. These rolls can be used while cooling or heating depending on the physical properties of the discharged sheet or rod-like product. The speed of the splitting rolls is controlled so that they rotate a little more quickly than the rate at which the sheet or rod-like product is discharged. The roll pressure can be controlled by adjusting the clearance between the rolls depending on the form of the discharged product and the degree of stretching of the desired product. In this way, there can be obtained preferred split fibers.

Also, by contacting the sheet or rod-like product with a dull knife rotating at a high speed, fibrous materials can be obtained. When the sheet or rod-like product is contacted with the dull knife rotating at a high speed, it is split by the action of tear strength, shear strength, and tensile strength, resulting in the production of fibrous materials. The term "dull knife" as used herein refers to a knife which is from 0.5 to 5 millimeters, preferably from 0.5 to 2 millimeters in thickness and is not sharp, and which is in contact with the sheet or rod-like product while rotating. The speed of rotation of the dull knife varies depending on the thickness thereof. In general, the speed of rotation is controlled so that it is low for those dull knives having a small thickness, whereas it is high for those dull knives having a large thickness. Usually, in both cases, the speed of rotation is within the range of from 800 to 3,000 rpm, preferably from 1,000 to 2,000 rpm. In more detail, commercially available food cutters, speed kneaders, speed mills or like machines provided with the foregoing dull knife are suitable and convenient to use, and there can be obtained the desired split fibers.

As binders as used herein, those binders which are commonly used to be eaten can be used. Examples, are egg protein (e.g., albumen, etc.), milk protein (e.g., casein, sodium caseinate, etc.), soy bean protein, wheat protein, gelatin, colagen, muscle protein, protein from ground fish meat, gum (e.g., guar gum, xanthane gum, and carrageenan), and starch. More preferred binders are those emulsions which are prepared by emulsifying egg, starch, fat and oil, and water.

The amount of the o/w type emulsion being added to the fibrous protein and the binder is suitable to be from 5 to 50% based on the weight of the ultimate product.

When the amount of the emulsion added is less than 5% by weight, the resulting product fails to provide a sufficiently satisfactory juicy feeling. On the other hand, when it is more than 50% by weight, the proportion of fat in the resulting product increases, providing an unpleasant appearance.

The fibrous protein, the binder, and the o/w type emulsion can be mixed by means of commercially available mixers, kneaders, etc. At this time, if various flavors, (e.g., beef, pork, chicken, shrimp and crab) extracts, flavoring matters, and so forth are added, there can be obtained meatlike foodstuffs having the desired flavor or taste.

The thus-produced fibrous protein/binder o/w type emulsion mixture is then molded and heated. This molding and heating can be performed by the usual procedure. For example, the mixture is placed in a suitable mold and heated at a temperature of from 60° to 135° C., preferably from 70° to 120° C. whereby the desired food product is obtained. When the mixture is introduced into the mold through a long nozzle, the fibers thereof are orientated. Thus, by using such long nozzles, it is possible to produce meat-like foodstuffs having a more preferred eating feeling.

With the food material resembling the fat of meat, produced using the above-described specific o/w type emulsion, the fat and oil content of the emulsion is very high and the composition is closely similar to the natural fat. Furthermore, the food material easily releases oil. Since such food materials resembling the fat of meat are used in the present invention, when the resulting foodstuffs of the invention are chewed, the oil spreads in the mouth and provides a juicy feeling like the natural meat. Since the fibrous protein produced by the specific method is used, the meat-like foodstuff of the invention provides a fibrous eating feeling closely resembling the natural meat. In place of the fibrous protein can be used the structural soy bean protein.

In this case, the course of kneading the structural soy bean protein with the foregoing food material, or of molding and heating, a part of the food material enters the porous structure, producing the effect of masking the soy bean odor. Any structural soy bean proteins produced by the known procedures can be used.

In accordance with the present invention, even if heating is applied in the production of meat-like foodstuffs, no uniform dispersion of fat occurs unlike the conventional solid fat and, therefore, there can be obtained an appearance closely resembling the natural meat.

BEST MODE FOR CARRYING OUT THE INVENTION

The present invention is described in greater detail by reference to the following examples and reference example.

EXAMPLE 1

An aqueous mixture was prepared using 420 grams of defatted soy bean powder, 180 grams of wheat gluten, and 400 grams of water. The aqueous mixture was processed by means of an experimental extruder (length-/diameter (L/D)=25; inner diameter; 30 millimeters; nozzle sheet die; 20 millimeters×2 millimeters×100 millimeters) under the following conditions:

| Temperature of Extruder | |
| --- | --- |
| Near the feed inlet | 80° C. |
| Central area | 140° C. |
| Near the discharge end | 120° C. |
| Number of revolutions of screw | 40 rpm |

Upon introduction of the aqueous mixture in the extruder, there was obtained a well-orientated fibrous sheet-like product. This product was hydrated and, thereafter, split by means of splitting rolls to obtain fibrous protein.

A mixture of 40 grams of egg white powder, 70 grams of pig skin collagen, 10 grams of guar gum, 100 grams of water, and 200 grams of soy bean oil was placed in a homogenizer and emulsified for 10 minutes at a rate of 5,000 revolutions per minute (rpm). The thus-obtained o/w emulsion was placed in a vertical mixer and, while stirring the emulsion at a rate of 150 rpm, 550 grams of soy bean oil was further added to obtain a fat-like food material closely resembling the natural fat of meat and having a transparent feeling.

To 600 grams of the above-produced fibrous protein were added 30 grams of egg white powder, 40 grams of beef extract, 5 grams of beef flavor, 80 grams of water, 1 gram of red dye, and further, 150 grams of the above-produced fat-like food material. The resulting mixture was placed in a mold and heated at 90° C., whereby there was obtained a meat-like foodstuff having a juicy feeling and closely resembling the natural meat.

EXAMPLE 2

A mixture of 26 grams of separated soy bean protein, 120 grams of lard collagen, 140 grams of water, and 460 grams of corn oil was placed in a food cutter and emulsified by cutting at 3,000 rpm for 20 minutes to obtain an o/w type emulsion.

The thus-obtained emulsion was placed in a mixer and while stirring the emulsion at 270 rpm, 460 grams of corn oil was gradually added thereto to obtain a fat-like food material.

A mixture of 270 grams of egg white, 180 grams of potato starch, 570 grams of corn oil, 100 grams of beef extract, and 500 grams of water was placed in a food cutter and emulsified at 1,500 rpm for 10 minutes to obtain an emulsion.

To 600 grams of the fibrous protein produced in Example 1 were added 1 gram of red dye, 100 grams of water, and further 200 grams of the above-produced emulsion and 100 grams of the above produced fat-like food material. The resulting mixture was placed in a mold and heated at 100° C. for 40 minutes. With the thus-obtained meat-like foodstuff, the appearance was similar to that of meat loaf, and the eating feeling was excellent, i.e., was rich in fibrous properties, had a juicy feeling, and was superior in taste.

EXAMPLE 3

A dough was prepared by mixing 300 grams of defatted soy bean powder, 300 grams of wheat gluten, and 400 grams of water. This mixture was processed in the same manner as in Example 1 to produce fibrous protein.

To 600 grams of the fibrous protein were added 1 gram of red dye and 50 grams of water, and the resulting mixture was uniformly kneaded. Furthermore, the emulsion and fat-like food material produced in Example 2 were added thereto in amounts of 150 grams and 170 grams, respectively. The resulting mixture was placed in a mold and heated at 100° C., whereby there was obtained a meat-like foodstuff having good fibrous properties and a juicy feeling, which was similar to corn beef.

REFERENCE EXAMPLE

Sample A produced in Example 1 was compared with Sample B which was produced in the same manner as in Example 1 except that the fat-like food material was not added, and Sample C which was produced in the same manner as in Example 1 except that a conventional fat-like food material produced by the method described in Japanese Patent Publication No. 24458/79 was used in place of the fat-like food material of Example 1. The results are shown in the table below. The evaluation was performed by ten specialists according to the five point system.

As apparent from the table, the meat-like foodstuff of the invention is markedly superior to the conventional products.

TABLE 1

|  | Sample | | |
| --- | --- | --- | --- |
|  | A | B | C |
| Appearance | 4.8 | 3.0 | 3.5 |
| Juicy Feeling | 4.5 | 2.5 | 2.8 |
| Taste | 4.5 | 2.4 | 2.7 |
| Total Evaluation | 4.6 | 2.9 | 3.0 |

We claim:
1. A process for producing a meat-like foodstuff which comprises mixing:
   (a) an oil in water emulsion having a compression oil-releasing ratio of at least 15% and composed mainly of (a) protein, (b) fat and oil, (c) water, the weight ratio of (a):(b):(c) being 1:6.3–40:1–20;
   (b) a fibrous protein which is prepared by kneading a mixture of a vegetable protein-containing substance and water, orientating the resulting mixture by applying shear stress in a heated state and, thereafter, splitting it; and
   (c) a binder, and molding and heating the resulting mixture.

2. The process as claimed in claim 1, wherein the amount of the oil in water type emulsion is from 5 to 50% by weight of the meat-like foodstuff.

3. The process as claimed in claim 1, wherein the vegetable protein-containing substance consists of soy bean protein and wheat gluten, the weight ratio of soy bean protein to wheat gluten being from 8:2 to 2:8, and has a protein content (calculated as solids) of at least 40%.

4. The process as claimed in claim 1, wherein the binder is an emulsion prepared by emulsifying egg white, starch, oil and fat, and water.

5. The process of claim 1 wherein the weight ratio of (a):(b):(c) is 1:6.8:1–20.

6. The process of claim 1 wherein the weight ratio of (a):(b):(c) is 1:6.3:1–20.

* * * * *